(12) United States Patent
Shang et al.

(10) Patent No.: US 9,397,748 B2
(45) Date of Patent: Jul. 19, 2016

(54) METHOD, SYSTEM, AND DEVICE FOR DETECTING OPTICAL SIGNAL-TO-NOISE RATIO

(71) Applicant: ZTE Corporation, Shenzhen, Guangdong (CN)

(72) Inventors: Yingchun Shang, Shenzhen (CN); Bailin Shen, Shenzhen (CN); Xun Chen, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/421,968

(22) PCT Filed: Jul. 23, 2013

(86) PCT No.: PCT/CN2013/079939
§ 371 (c)(1),
(2) Date: Feb. 16, 2015

(87) PCT Pub. No.: WO2013/167074
PCT Pub. Date: Nov. 14, 2013

(65) Prior Publication Data
US 2015/0222354 A1 Aug. 6, 2015

(30) Foreign Application Priority Data
Oct. 25, 2012 (CN) .......................... 2012 1 0413103

(51) Int. Cl.
*H04B 10/08* (2006.01)
*H04B 10/079* (2013.01)
(Continued)

(52) U.S. Cl.
CPC .......... *H04B 10/07953* (2013.01); *H04B 10/07* (2013.01); *H04B 10/0775* (2013.01); *H04B 10/2504* (2013.01)

(58) Field of Classification Search
CPC ............. H04B 10/07953; H04B 10/07; H04B 10/0775; H04B 10/2504; H04B 10/077; H04B 10/0773; H04B 10/0795
USPC .......................................................... 398/26
See application file for complete search history.

(56) References Cited

U.S. PATENT DOCUMENTS 5,513,029 A * 4/1996 Roberts ................ H04B 10/035
359/333
6,912,359 B2 6/2005 Blumenthal
(Continued)

FOREIGN PATENT DOCUMENTS

| CN | 101442376 A | 5/2009 |
| CN | 102246435 A | 11/2011 |

(Continued)

OTHER PUBLICATIONS

Fred Heismann, signal tracking and performance monitoring in multi-wavelength optical networks, 22nd European Conference on Optical Communication, 1996, p. 47-50.
(Continued)

*Primary Examiner* — M. R. Sedighian
(74) *Attorney, Agent, or Firm* — Oppedahl Patent Law Firm LLC

(57) ABSTRACT

A method for detecting an optical signal-to-noise ratio (OSNR). A wavelength label loading end (11) loads a wavelength label signal in an optical signal, and sends a loading modulation depth of the wavelength label signal to an OSNR detection end (12) through a wavelength label channel or an optical monitoring channel. The OSNR detection end (12) obtains a loading modulation depth of a wavelength label signal loaded in each wavelength optical signal, parses the wavelength label signal to obtain a current modulation depth of the wavelength label signal, and obtains an OSNR value of each wavelength optical signal according to the loading modulation depth and the current modulation depth of the wavelength label signal. A system and device for detecting an OSNR applicable to OSNR tests of present optical signals with high rates of 40 G, 100 G, etc., and in particular to OSNR tests of polarization multiplexing optical signals.

13 Claims, 4 Drawing Sheets

(51) Int. Cl.
  *H04B 10/077* (2013.01)
  *H04B 10/07* (2013.01)
  *H04B 10/25* (2013.01)

(56) References Cited

U.S. PATENT DOCUMENTS

| | | |
|---|---|---|
| 6,931,214 B1 | 8/2005 | Carrick |
| 7,197,243 B1 | 3/2007 | Harley |
| 7,283,752 B2 | 10/2007 | Liu |
| 8,165,467 B2 | 4/2012 | Fukashiro |
| 8,396,364 B2 | 3/2013 | Lee |
| 2002/0044322 A1 | 4/2002 | Blumenthal |
| 2004/0208525 A1 | 10/2004 | Seydnejad |
| 2005/0226633 A1 | 10/2005 | Liu |
| 2005/0286890 A1 | 12/2005 | Carrick |
| 2006/0078337 A1 | 4/2006 | Harley |
| 2009/0136233 A1 | 5/2009 | Fukashiro |
| 2010/0202773 A1 | 8/2010 | Lee |
| 2012/0106951 A1 | 5/2012 | Wan |

FOREIGN PATENT DOCUMENTS

| | | |
|---|---|---|
| CN | 102571213 A | 7/2012 |
| CN | 102594447 A | 7/2012 |
| CN | 102611950 A | 7/2012 |
| CN | 102904635 A | 1/2013 |
| EP | 1158713 A2 | 11/2001 |
| JP | 2002075554 A | 3/2002 |
| JP | 2002531926 A | 9/2002 |
| JP | 2006066281 A | 3/2006 |

OTHER PUBLICATIONS

G.R. Hill, A transport network layer based on optical network elements, Journal of Lightwave Technology, vol. 11, No. 5/6, May/Jun. 1993, p. 667-679.
Supplementary European Search Report in European application No. 13787273.5, mailed on Aug. 20, 2015.
International Search Report in international application No. PCT/CN2013/079939, mailed on Oct. 24, 2013.
English Translation of the Written Opinion of the International Search Authority in international application No. PCT/CN2013/079939, mailed on Oct. 24, 2013.
A transport network layer based on optical network elements, 1993.
Signal tracking and performance monitoring in multi-wavelength optical networks, 1996.
Technical Requirements for Reconfigurable Optical Add Drop Multiplexing (ROADM) Equipment, YD/T 2003-2009, mailed on Dec. 11, 2009.

* cited by examiner

METHOD, SYSTEM, AND DEVICE FOR DETECTING OPTICAL SIGNAL-TO-NOISE RATIO

TECHNICAL FIELD

The disclosure relates to optical communication technology, in particular to a method, system, and device for detecting an optical signal-to-noise ratio (OSNR).

BACKGROUND

With development of Wavelength Division multiplexing (WDM), optical signals of tens to hundreds of wavelengths may be transmitted in a same optical fiber simultaneously in an existing optical communication network. In addition, Reconfigurable Optical Add-Drop Multiplexer (ROADM) based technology facilitates as-needed wavelength configuration in optical communication. Thus, inter-site path of a wavelength in an optical network does not always remain the same. A certain wavelength is not always allocated to the same 2 sites.

In a wavelength Division multiplexing system, industrial research has been done on loading a pilot tone signal for a wavelength for various specific applications. A pilot tone signal sometimes is called a low-frequency dither signal. Loading a pilot tone signal to a signal of a wavelength has little impact on transmission performance. For example, in "A transport network layer based on an optical network elements" jointly published in Journal of Lightwave Technology, 1993 by BT laboratory in United Kingdom, Ericsson in Sweden et al, it is proposed to use a pilot tone signal for power management and wavelength channel confirmation as required by failure management in a wavelength Division multiplexing system. In patent publication No. US 005513029, titled "method and apparatus for monitoring performance of optical transmission systems" applied for by Kim B. Roberts of Nortel company in Canada, 1994, a method for monitoring optical amplifier performance is proposed, where a pilot tone signal with a known modulation depth is monitored for forecast of signal and noise components of an optical amplifier. In addition, in paper No.WeB2.2, titled "signal tracking and performance monitoring in multi-wavelength optical networks" published in ECOC'96 conference, 1996 by Fred Heismann et al of Bell lab, US, a solution for implementing online wavelength route tracking in a Wavelength Division multiplexing network is disclosed, where an optical signal of a wavelength is modulated with a unique pilot tone signal, digital information encoding is performed by Frequency Shift Keying, and the pilot tone signal is monitored at any site in an optical network, such that wavelength route information of the whole network may be learned.

For testing an optical signal-to-noise ratio (OSNR) of an existing optical signal of a high rate such as 40 G, 100 G, or the like, in particular that of a polarization multiplexed optical signal, no interpolation or polarization extinction for conventional OSNR detection can be used, and a new method for OSNR detection is required. In a patent of ALCATEL LUCENT company with publication No. US20120106951A1, titled "In-band optical signal-to-noise ratio measurement", narrowband optical signals of a center-passband and of an offset-passband are filtered out respectively by a narrowband optical tunable filter. Through the pilot tone and the strength of the two narrowband optical signals, the payload optical signal and a strength of an Amplified Spontaneous Emission (ASE) noise accumulated in an Erbium-doped optical fiber amplifier can be computed, so as to compute the OSNR. However, with the method, OSNR calibration or the like has to be performed taking into account a modulation code type of an optical payload signal, with complicated implementation and a complicated algorithm, to the disadvantage of wide-range flexible use in ROADMs.

SUMMARY

In view of this, it is desired that embodiments of the disclosure provide a method, system, and device for detecting an optical signal-to-noise ratio, capable of testing an OSNR of an existing optical signal of a high rate such as 40 G or 100 G, in particular that of a polarization multiplexed optical signal.

To this end, a technical solution of an embodiment of the disclosure is implemented as follows.

According to an embodiment of the disclosure, a system for detecting an optical signal-to-noise ratio (OSNR) includes a wavelength label loader and an OSNR detector.

The wavelength label loader is configured for loading a wavelength label signal in an optical signal, and sending a loading modulation depth corresponding to the wavelength label signal to the OSNR detector.

The OSNR detector is configured for: acquiring a loading modulation depth corresponding to a wavelength label signal loaded in an optical signal of a wavelength; analyzing the wavelength label signal to acquire a current modulation depth corresponding to the wavelength label signal; and acquiring, according to the current modulation depth and the loading modulation depth corresponding to the wavelength label signal, an OSNR of the optical signal of the wavelength.

The wavelength label loader may be configured for sending the loading modulation depth corresponding to the wavelength label signal as on-path information in a wavelength label channel or as content of an Optical Supervision Channel (OSC).

The wavelength label loader may include a wavelength label loading unit, a first optical splitter, and a first modulation depth detecting unit.

The wavelength label loading unit may be configured for loading the wavelength label signal in a high-speed optical signal.

The first optical splitter may be configured for distributing an optical signal bearing a wavelength label signal.

The first modulation depth detecting unit may be configured for: analyzing a wavelength label signal loaded in an optical signal of a single wavelength to acquire the loading modulation depth corresponding to the wavelength label signal, and sending the loading modulation depth corresponding to the wavelength label signal to the OSNR detector via the wavelength label channel or the OSC.

The wavelength label loader may further include a first optical tunable filter configured for demultiplexing the optical signal distributed by the first optical splitter when the wavelength label signal is loaded in a multiwavelength optical signal of an optical multiplexed section.

The first modulation depth detecting unit may be configured for: obtaining the loading modulation depth according to a Direct-Current (DC) amplitude of single-wavelength optical power and an amplitude corresponding to a frequency of the wavelength label signal of the time upon loading the wavelength label signal; and transferring the loading modulation depth in the optical signal via the wavelength label channel, or transferring the loading modulation depth via the OSC.

The first modulation depth detecting unit may be further configured for feeding the loading modulation depth corresponding to the wavelength label signal back to the wavelength label loading unit. The wavelength label loading unit may be further configured for adjusting the loading modulation depth corresponding to the wavelength label signal.

The OSNR detector may be configured for acquiring the loading modulation depth via a wavelength label channel or an Optical Supervision Channel (OSC).

The OSNR detector may be set anywhere on a transmission path of the optical signal bearing the wavelength label signal.

The OSNR detector may include a second optical splitter, a wavelength label information detecting unit, a second modulation depth detecting unit, and an OSNR acquiring unit.

The second optical splitter may be configured for distributing an optical signal bearing a wavelength label signal.

The wavelength label information detecting unit may be configured for acquiring the loading modulation depth via the wavelength label channel or the OSC, and sending the loading modulation depth to the OSNR acquiring unit.

The second modulation depth detecting unit may be configured for: analyzing the wavelength label signal to acquire the current modulation depth corresponding to the wavelength label signal, and sending the current modulation depth to the OSNR acquiring unit.

The OSNR acquiring unit may be configured for acquiring, according to the current modulation depth and the loading modulation depth corresponding to the wavelength label signal, the OSNR of the optical signal of the wavelength.

The OSNR detector may further include a second optical tunable filter configured for demultiplexing the optical signal distributed by the second optical splitter on an optical multiplexed section bearing the wavelength label signal.

The second modulation depth detecting unit may be configured for obtaining the current modulation depth corresponding to the wavelength label signal according to a Direct-Current (DC) amplitude of a sum of single-wavelength noise power and current single-wavelength optical power with the wavelength label, and an amplitude corresponding to a frequency of the current wavelength label signal obtained by analyzing the wavelength label.

The OSNR acquiring unit may be further configured for adjusting the OSNR according to a frequency range of an Amplified Spontaneous Emission (ASE) noise.

The wavelength label information detecting unit may be integrated in the second modulation depth detecting unit.

According to an embodiment herein, a method for detecting an optical signal-to-noise ratio (OSNR) includes:

loading, by a wavelength label loader, a wavelength label signal in an optical signal, and sending a loading modulation depth corresponding to the wavelength label signal to an OSNR detector via a wavelength label channel or an Optical Supervision Channel (OSC); and acquiring, by the OSNR detector, a loading modulation depth corresponding to when a wavelength label signal is loaded in an optical signal of a wavelength; analyzing the wavelength label signal to acquire a current modulation depth corresponding to the wavelength label signal; and acquiring, according to the current modulation depth and the loading modulation depth corresponding to the wavelength label signal, an OSNR of the optical signal of the wavelength.

The sending a loading modulation depth corresponding to the wavelength label signal to an OSNR detector may include: sending the loading modulation depth corresponding to the wavelength label signal as on-path information in a wavelength label channel or as content of an Optical Supervision Channel (OSC).

The acquiring, by the OSNR detector, a loading modulation depth corresponding to when a wavelength label signal is loaded in an optical signal of a wavelength may include: acquiring, by the OSNR detector, the loading modulation depth via the wavelength label channel or the OSC.

The analyzing the wavelength label signal to acquire a current modulation depth corresponding to the wavelength label signal may include: obtaining the current modulation depth corresponding to the wavelength label signal according to a Direct-Current (DC) amplitude of a sum of single-wavelength noise power and current single-wavelength optical power with the wavelength label, and an amplitude corresponding to a frequency of the current wavelength label signal obtained by analyzing the wavelength label.

The method may further include: adjusting, by the OSNR detector, the OSNR according to a frequency range of an Amplified Spontaneous Emission (ASE) noise.

According to an embodiment herein, a wavelength label loader includes a wavelength label loading unit, a first optical splitter, and a first modulation depth detecting unit.

The wavelength label loading unit is configured for loading a wavelength label signal in a high-speed optical signal.

The first optical splitter is configured for distributing an optical signal bearing a wavelength label signal.

The first modulation depth detecting unit is configured for: analyzing a wavelength label signal loaded in an optical signal of a single wavelength to acquire a loading modulation depth corresponding to the wavelength label signal, and sending the loading modulation depth corresponding to the wavelength label signal to an OSNR detector via a wavelength label channel or an Optical Supervision Channel (OSC).

According to an embodiment herein, an optical signal-to-noise ratio (OSNR) detector includes a second optical splitter, a wavelength label information detecting unit, a second modulation depth detecting unit, and an OSNR acquiring unit.

The second optical splitter is configured for distributing an optical signal bearing a wavelength label signal.

The wavelength label information detecting unit is configured for acquiring a loading modulation depth via a wavelength label channel or an Optical Supervision Channel (OSC), and sending the loading modulation depth to the OSNR acquiring unit.

The second modulation depth detecting unit is configured for: analyzing the wavelength label signal to acquire a current modulation depth corresponding to the wavelength label signal, and sending the current modulation depth to the OSNR acquiring unit.

The OSNR acquiring unit is configured for acquiring, according to the current modulation depth and the loading modulation depth corresponding to the wavelength label signal, an OSNR of the optical signal of a wavelength.

Embodiments of the disclosure provide a method, system, and device for detecting an optical signal-to-noise ratio. A wavelength label loader loads a wavelength label signal in an optical signal, and sends a loading modulation depth corresponding to the wavelength label signal to an OSNR detector. The OSNR detector acquires a loading modulation depth corresponding to a wavelength label signal loaded in an optical signal of a wavelength. The OSNR detector analyzes the wavelength label signal to acquire a current modulation depth corresponding to the wavelength label signal. The OSNR detector acquires, according to the current modulation depth and the loading modulation depth corresponding to the wavelength label signal, an OSNR of the optical signal of the wavelength. The disclosure is suitable for testing an OSNR of an existing optical signal of a high rate such as 40 G or 100 G, in particular that of a polarization multiplexed optical signal.

DETAILED DESCRIPTION

According to embodiments of the disclosure, based on a Wavelength Division multiplexing system with wavelength labelling, an Optical Signal Noise Ratio (OSNR) of a Wavelength Division system is detected by fine control and measurement of a modulation depth corresponding to a wavelength label signal. Refer to China Posts and Telecommunications Industry Standards YD/T 2003-2009, "Technical Requirements to a Reconfigurable Optical Add-Drop Multiplexing (ROADM) device", Appendix D for wavelength labeling/tracking in an ROADM application. At a source end of a wavelength path, before a signal of a wavelength enters a Wavelength Division network, modulation encoding is performed using an encoder, to add an identifier unique within the whole network, i.e., a wavelength label, to a signal of a wavelength. A wavelength label of a wavelength passing through a reference point of a node on the wavelength path may be monitored and identified by an embedded wavelength label detector.

At a source end of a wavelength label, a wavelength label may be loaded for a wavelength using a single frequency. When 1 is transferred at a certain bit or Baud, a wavelength label frequency is loaded within a current time window. When 0 is transferred, no frequency of the wavelength label signal is loaded. At a source end, a wavelength label may be loaded with some encoding to add information such as frame check. At a receiving end, wavelength label information sent by a source end may be detected according to a change in an amplitude of a frequency of the wavelength label signal within a time window.

According to an embodiment of the disclosure, a wavelength label loader loads a wavelength label signal in an optical signal, and sends a loading modulation depth corresponding to the wavelength label signal to an OSNR detector; the OSNR detector acquires a loading modulation depth corresponding to when a wavelength label signal is loaded in an optical signal of a wavelength; the OSNR detector analyzes the wavelength label signal to acquire a current modulation depth corresponding to the wavelength label signal; the OSNR detector acquires, according to the current modulation depth and the loading modulation depth corresponding to the wavelength label signal, an OSNR of the optical signal of the wavelength.

The disclosure is further elaborated with reference to drawings and specific embodiments.

Figure 1:
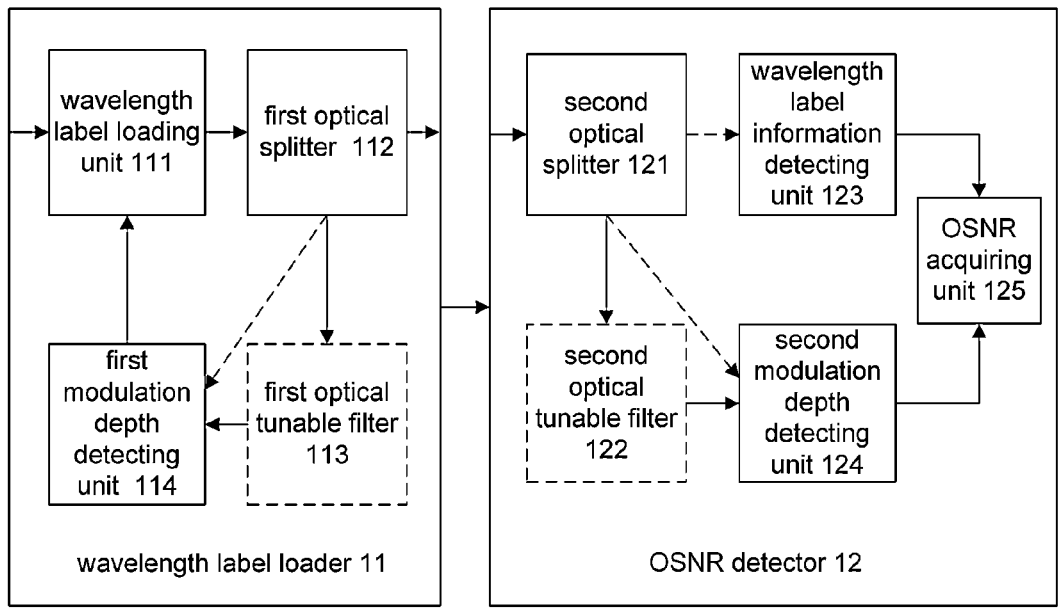
FIG. 1 is a schematic diagram of a structure of a system for detecting an OSNR according to an embodiment of the disclosure.

According to an embodiment of the disclosure, a system for detecting an optical signal-to-noise ratio, as shown in FIG. 1, may include a wavelength label loader 11 and an OSNR detector 12.

The wavelength label loader 11 may be configured for loading a wavelength label signal in an optical signal, and sending a loading modulation depth corresponding to the wavelength label signal to the OSNR detector 12.

The wavelength label loader 11 may be configured for sending the loading modulation depth corresponding to the wavelength label signal as on-path information in a wavelength label channel or as content of an Optical Supervision Channel (OSC).

The wavelength label loader 11 may include a wavelength label loading unit 111, a first optical splitter 112, and a first modulation depth detecting unit 114.

The wavelength label loading unit 111 may be configured for loading the wavelength label signal in a high-speed optical signal. A wavelength label may be loaded to an optical signal using a device such as an Integrable Tunable Laser Assembly (ITLA), an Electrically Variable Optical Attenuator (EVOA), or an optical amplifier. When a wavelength label signal is loaded in a multiwavelength optical signal of an optical multiplexed section, a device such as an EVOA or an optical amplifier may be used. When a wavelength label signal is loaded in a single wave, a device such as an ITLA, an EVOA, or an optical amplifier may be used.

The first optical splitter 112 may be configured for distributing an optical signal bearing a wavelength label signal.

The first modulation depth detecting unit 114 may be configured for analyzing a wavelength label signal loaded in an optical signal of a single wavelength to acquire the loading modulation depth corresponding to the wavelength label signal, and sending the loading modulation depth corresponding to the wavelength label signal to the OSNR detector via a wavelength label channel or an OSC.

The wavelength label loader 11 may further include a first optical tunable filter 113 configured for demultiplexing the optical signal distributed by the first optical splitter 112 when the wavelength label signal is loaded in a multiwavelength optical signal of an optical multiplexed section. When a wavelength label signal is loaded in a single wave, the wavelength label loader 11 does not require the first optical tunable filter 113.

The first modulation depth detecting unit 114 may be configured for: obtaining the loading modulation depth corresponding to the wavelength label signal according to a Direct-Current (DC) amplitude of single-wavelength optical power and an amplitude corresponding to a frequency of the wavelength label signal of the time upon loading the wavelength label signal frequency of the wavelength label signal; and transferring the loading modulation depth in the optical signal via the wavelength label channel, or transferring the loading modulation depth via the OSC.

The first modulation depth detecting unit 114 may obtain the loading modulation depth $m_1$ according to the DC amplitude $P_{s1}$ of single-wavelength optical power and the amplitude $P_{t1}$ corresponding to the frequency of the wavelength label signal of the time upon loading the wavelength label signal in accordance with formula (1), and send the loading modulation depth $m_1$ to the OSNR detector via the wavelength label channel or the OSC.

$$\frac{P_{t1}}{P_{s1}} = m_1 \qquad (1)$$

The first modulation depth detecting unit 114 may be configured for feeding the loading modulation depth corresponding to the wavelength label signal back to the wavelength label loading unit 111. The wavelength label loading unit 111 may adjust the loading modulation depth corresponding to the wavelength label signal within a proper scope, of 5%~10%, for example.

The OSNR detector 12 may be configured for: acquiring a loading modulation depth corresponding to a wavelength label signal loaded in an optical signal of a wavelength; analyzing the wavelength label signal to acquire a current modulation depth corresponding to the wavelength label signal; and acquiring, according to the current modulation depth and the loading modulation depth corresponding to the wavelength label signal, an OSNR of the optical signal of the wavelength.

The OSNR detector 12 may be configured for acquiring the loading modulation depth via a wavelength label channel or an OSC.

The OSNR detector 12 may be set anywhere on a transmission path of the optical signal bearing the wavelength label.

The OSNR detector 12 may include a second optical splitter 121, a wavelength label information detecting unit 123, a second modulation depth detecting unit 124, and an OSNR acquiring unit 125.

The second optical splitter 121 may be configured for distributing an optical signal bearing a wavelength label signal.

The wavelength label information detecting unit 123 may be configured for acquiring the loading modulation depth via the wavelength label channel or the OSC, and sending the loading modulation depth to the OSNR acquiring unit 125.

The second modulation depth detecting unit 124 may be configured for analyzing the wavelength label signal to acquire the current modulation depth corresponding to the wavelength label signal, and sending the current modulation depth to the OSNR acquiring unit 125.

The OSNR acquiring unit 125 may be configured for acquiring, according to the current modulation depth and the loading modulation depth corresponding to the wavelength label signal, the OSNR of the optical signal of the wavelength.

The OSNR detector 12 may further include a second optical tunable filter 122 configured for demultiplexing the optical signal distributed by the second optical splitter 121 when a wavelength label signal is loaded on a multiwavelength optical signal of an optical multiplexed section.

The second modulation depth detecting unit 124 may be configured for obtaining, according to formula (2), the current modulation depth $m_2$ corresponding to the wavelength label signal according to a sum of DC amplitudes of single-wavelength noise power $P_{ase}$ and of current single-wavelength optical power $P_{s2}$ with the wavelength label, and an amplitude $P_{t2}$ corresponding to a frequency of the current wavelength label signal obtained by analyzing the wavelength label. The single-wavelength noise power $P_{ase}$ refers to intra-bandwidth noise power of the second optical tunable filter 122 when there is the second optical tunable filter, or to single wavelength intra-bandwidth noise power after demultiplexing when there is no second optical tunable filter.

$$\frac{P_{t2}}{P_{s2} + P_{ase}} = m_2 \qquad (2)$$

The OSNR acquiring unit 125 may compute an OSNR of an optical signal of a wavelength $OSNR_t$, as shown in formula (3):

$$OSNR_t = \frac{P_{s2}}{P_{ase}} = \frac{m_2}{m_1 - m_2} \qquad (3)$$

according to a constant ratio of a pilot tone component to a signal component during transmission, i.e.:

$$\frac{P_{t2}}{P_{s2}} = m_1$$

The OSNR acquiring unit 125 may be configured for adjusting the OSNR $OSNR_t$ according to a frequency range of an Amplified Spontaneous Emission (ASE) noise.

The $P_{ase}$ may be the ASE noise within the whole channel of the second optical tunable filter. An actual ASE measurement may be based on noise within 0.1 nm. Therefore, a noise width has to be adjusted. After the adjustment, intra-bandwidth noise power of the second optical tunable filter is $P_{ase\_0.1\ nm}$. Assuming an adjusting factor of K, formula (3) may be corrected to obtain an OSNR $OSNR_{t2}$, as shown in formula (4):

$$OSNR_{t2} = \frac{P_{s2}}{P_{ase\_0.1nm}} K \times \frac{m_2}{m_1 - m_2} \qquad (4)$$

An aforementioned OSNR is computed when the second optical tunable filter is the whole channel. However, the second optical tunable filter may not always take up the whole channel bandwidth. When the optical signal channel is 0.4 nm wide, and the second optical tunable filter is a 0.3 nm-wide rectangle, the adjusting factor K=3. When the optical signal channel is 0.4 nm wide, the second optical tunable filter is a 3-order Gaussian filter, and the 3 dB bandwidth is 30 GHz, the adjusting factor K=1.9885.

Figure 2:
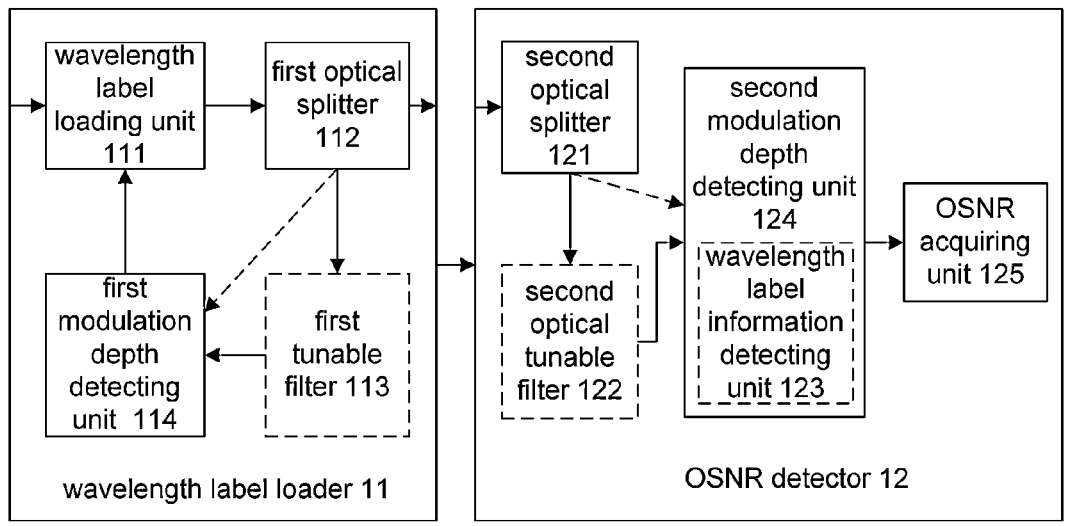
FIG. 2 is a schematic diagram of a structure with a wavelength label information detecting unit integrated to a second modulation depth detecting unit in a system for detecting an OSNR according to an embodiment of the disclosure.

The wavelength label information detecting unit 123 and the second modulation depth detecting unit 124 may be integrated into one detecting unit. As shown in FIG. 2, the wavelength label information detecting unit 123 may be integrated in the second modulation depth detecting unit 124. Then, the second modulation depth detecting unit 124 may be configured for acquiring the loading modulation depth via a wavelength label channel or an OSC and sending the loading modulation depth to the OSNR acquiring unit 125.

Based on the system, an embodiment of the disclosure further provides a wavelength label loader. As shown in FIG. 1, the wavelength label loader 11 may include a wavelength label loading unit 111, a first optical splitter 112, and a first modulation depth detecting unit 114.

The wavelength label loading unit 111 may be configured for loading the wavelength label signal in a high-speed optical signal. A wavelength label may be loaded to an optical signal using a device such as an Integrable Tunable Laser Assembly (ITLA), an Electrically Variable Optical Attenuator (EVOA), or an optical amplifier. When a wavelength label signal is loaded in a multiwavelength optical signal of an optical multiplexed section, a device such as an EVOA or an optical amplifier may be used. When a wavelength label signal is loaded in a single wave, a device such as an ITLA, an EVOA, or an optical amplifier may be used.

The first optical splitter 112 may be configured for distributing an optical signal bearing a wavelength label signal.

The first modulation depth detecting unit 114 may be configured for analyzing a wavelength label signal loaded in an optical signal of a single wavelength to acquire the loading modulation depth corresponding to the wavelength label signal, and sending the loading modulation depth corresponding to the wavelength label signal to the OSNR detector via a wavelength label channel or an OSC.

The wavelength label loader 11 may further include a first optical tunable filter 113 configured for demultiplexing the optical signal distributed by the first optical splitter 112 when the wavelength label signal is loaded in a multiwavelength optical signal of an optical multiplexed section. When a wavelength label signal is loaded in a single wave, the wavelength label loader 11 does not require the first optical tunable filter 113.

The first modulation depth detecting unit 114 may be configured for: obtaining the loading modulation depth according to a Direct-Current (DC) amplitude of single-wavelength optical power and an amplitude corresponding to a frequency of the wavelength label signal of the time upon loading the wavelength label signal; and transferring the loading modulation depth in the optical signal via the wavelength label channel, or transferring the loading modulation depth via the OSC.

The first modulation depth detecting unit 114 may obtain the loading modulation depth $m_1$ according to the DC amplitude $P_{s1}$ of single-wavelength optical power and the amplitude $P_{t1}$ corresponding to the frequency of the wavelength label signal of the time upon loading the wavelength label signal in accordance with formula (1), and send the loading modulation depth $m_1$ to the OSNR detector via the wavelength label channel or the OSC.

$$\frac{P_{t1}}{P_{s1}} = m_1 \quad (1)$$

The first modulation depth detecting unit 114 may be configured for feeding the loading modulation depth corresponding to the wavelength label signal back to the wavelength label loading unit 111. The wavelength label loading unit 111 may adjust the loading modulation depth corresponding to the wavelength label signal within a proper scope, of 5%~10%, for example.

Based on the system, an embodiment of the disclosure further provides an OSNR detector. As shown in FIG. 1, the OSNR detector 12 may include a second optical splitter 121, a wavelength label information detecting unit 123, a second modulation depth detecting unit 124, and an OSNR acquiring unit 125.

The second optical splitter 121 may be configured for distributing an optical signal bearing a wavelength label signal.

The wavelength label information detecting unit 123 may be configured for acquiring the loading modulation depth via the wavelength label channel or the OSC, and sending the loading modulation depth to the OSNR acquiring unit 125.

The second modulation depth detecting unit 124 may be configured for analyzing the wavelength label signal to acquire the current modulation depth corresponding to the wavelength label signal, and sending the current modulation depth to the OSNR acquiring unit 125.

The OSNR acquiring unit 125 may be configured for acquiring, according to the current modulation depth and the loading modulation depth corresponding to the wavelength label signal, the OSNR of the optical signal of the wavelength.

The OSNR detector 12 may further include a second optical tunable filter 122 configured for demultiplexing the optical signal distributed by the second optical splitter 121 when a wavelength label signal is loaded on a multiwavelength optical signal of an optical multiplexed section.

The second modulation depth detecting unit 124 may be configured for obtaining, according to formula (2), the current modulation depth $m_2$ corresponding to the wavelength label according to a sum of DC amplitudes of single-wavelength noise power $P_{ase}$ and of current single-wavelength optical power $P_{s2}$ with the wavelength label, and an amplitude $P_{t2}$ corresponding to a frequency of the current wavelength label signal obtained by analyzing the wavelength label. The single-wavelength noise power $P_{ase}$ refers to intra-bandwidth noise power of the second optical tunable filter 122 when there is the second optical tunable filter, or to single wavelength intra-bandwidth noise power after demultiplexing when there is no second optical tunable filter.

$$\frac{P_{t2}}{P_{s2} + P_{ase}} = m_2 \quad (2)$$

The OSNR acquiring unit 125 may compute an OSNR of an optical signal of a wavelength $OSNR_t$, as shown in formula (3):

$$OSNR_t = \frac{P_{s2}}{P_{ase}} = \frac{m_2}{m_1 - m_2} \quad (3)$$

according to a constant ratio of a pilot tone component to a signal component during transmission, i.e.:

$$\frac{P_{t2}}{P_{s2}} = m_1$$

The OSNR acquiring unit 125 may be configured for adjusting the OSNR $OSNR_t$ according to a frequency range of an Amplified Spontaneous Emission (ASE) noise.

The $P_{ase}$ may be the ASE noise within the whole channel of the second optical tunable filter. An actual ASE measurement may be based on noise within 0.1 nm. Therefore, a noise width has to be adjusted. After the adjustment, intra-bandwidth noise power of the second optical tunable filter is $P_{ase\_0.1\,nm}$. Assuming an adjusting factor of K, formula (3) may be corrected to obtain an OSNR $OSNR_{t2}$, as shown in formula (4):

$$OSNR_{t2} = \frac{P_{s2}}{P_{ase\_0.1nm}} = K \times \frac{m_2}{m_1 - m_2} \quad (4)$$

An aforementioned OSNR is computed when the second optical tunable filter is the whole channel. However, the second optical tunable filter may not always take up the whole channel bandwidth. When the optical signal channel is 0.4 nm wide, and the second optical tunable filter is a 0.3 nm-wide rectangle, the adjusting factor K=3. When the optical signal channel is 0.4 nm wide, the second optical tunable filter is a 3-order Gaussian filter, and the 3 dB bandwidth is 30 GHz, the adjusting factor K=1.9885.

The wavelength label information detecting unit 123 and the second modulation depth detecting unit 124 may be integrated into one detecting unit. As shown in FIG. 2, the wavelength label information detecting unit 123 may be integrated in the second modulation depth detecting unit 124. Then, the second modulation depth detecting unit 124 may be configured for acquiring the loading modulation depth via a wavelength label channel or an OSC and sending the loading modulation depth to the OSNR acquiring unit 125.

Figure 3:
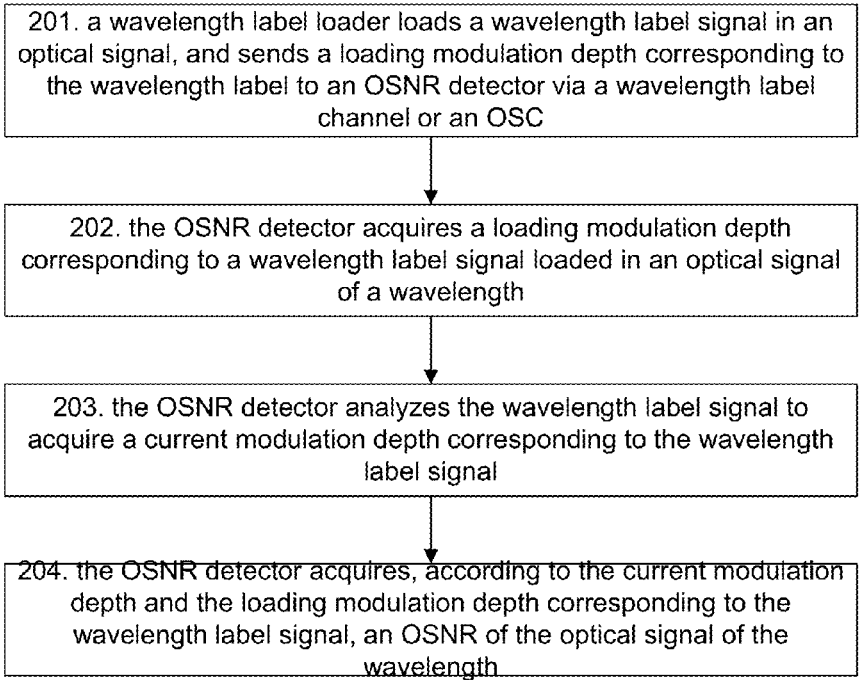
FIG. 3 is a flowchart of a method for detecting an OSNR according to an embodiment of the disclosure.

Based on the system, an embodiment of the disclosure further provides a method for detecting an OSNR. A as shown in FIG. 3, the method may include steps as follows.

In step 201, a wavelength label loader loads a wavelength label signal in an optical signal, and sends a loading modulation depth corresponding to the wavelength label signal to an OSNR detector via a wavelength label channel or an OSC.

The wavelength label loader may send the loading modulation depth $m_1$ corresponding to the wavelength label signal as on-path information in a wavelength label channel or as content of an OSC.

In step 202, the OSNR detector acquires a loading modulation depth corresponding to a wavelength label signal loaded in an optical signal of a wavelength.

The OSNR detector may acquire the loading modulation depth $m_1$ via a wavelength label channel or an OSC.

In step 203, the OSNR detector analyzes the wavelength label signal to acquire a current modulation depth corresponding to the wavelength label signal.

The OSNR detector may obtain, according to formula (2), the current modulation depth $m_2$ corresponding to the wavelength label according to a sum of DC amplitudes of single-wavelength noise power $P_{ase}$ and of current single-wavelength optical power $P_{s2}$ with the wavelength label, and an amplitude $P_{t2}$ corresponding to a frequency of the current wavelength label signal obtained by analyzing the wavelength label.

In step 204, the OSNR detector acquires, according to the current modulation depth and the loading modulation depth corresponding to the wavelength label signal, an OSNR of the optical signal of the wavelength.

The step may further include: the OSNR detector adjusting the OSNR according to a frequency range of an ASE noise.

Figure 4:
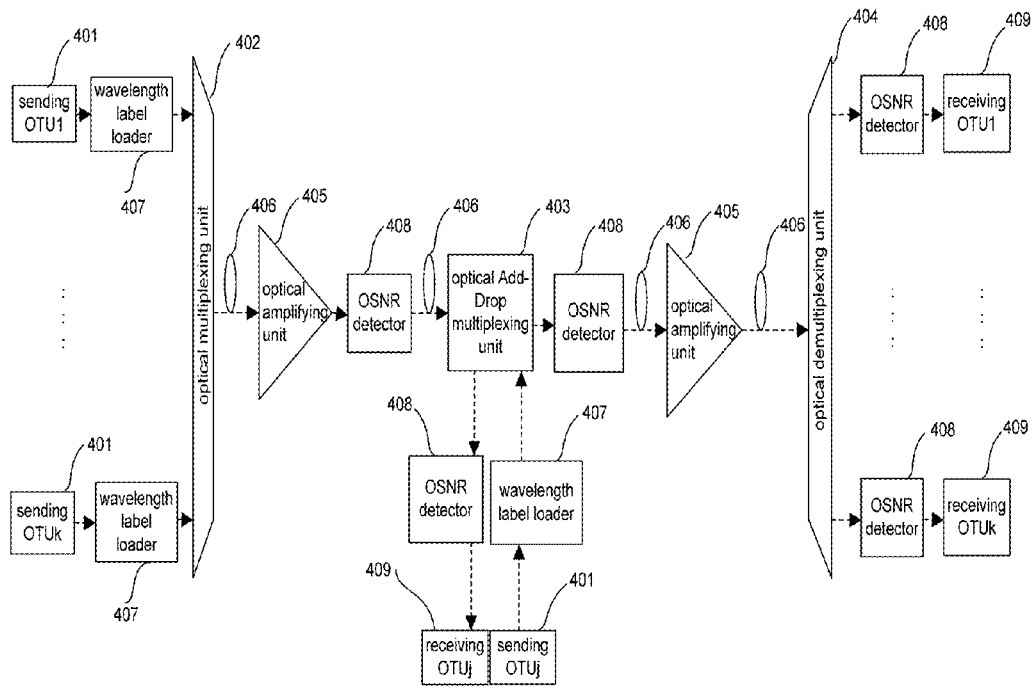
FIG. 4 is a schematic diagram of a scene of OSNR detection using a wavelength label according to an embodiment of the disclosure.

FIG. 4 is a typical scene of OSNR detection using a wavelength label. In FIG. 4, single fiber unidirectional transmission in a Wavelength Division multiplexing system may involve multiple optical signal sending optical transponder units (OTUs) 401, an optical multiplexing unit 402, an optical Add-Drop multiplexing unit 403, an optical demultiplexing unit 404, two optical amplifying units 405, optical fiber 406, multiple wavelengths label loaders 407, multiple OSNR detectors 408, and multiple optical signal receiving OTUs 409.

Note that OSNR detection may be performed at any point on a transmission path of an optical signal bearing a wavelength label. Shown in FIG. 4 is only a typical location for OSNR detection. For example, when there is multistage optical Add-Drop multiplexing in the system, after a wavelength label signal is loaded, an OSNR detector may be set at each optical Add-Drop multiplexing unit, before and after each optical amplifying unit, or before an optical signal receiving OTU for online OSNR monitoring.

Figure 5:
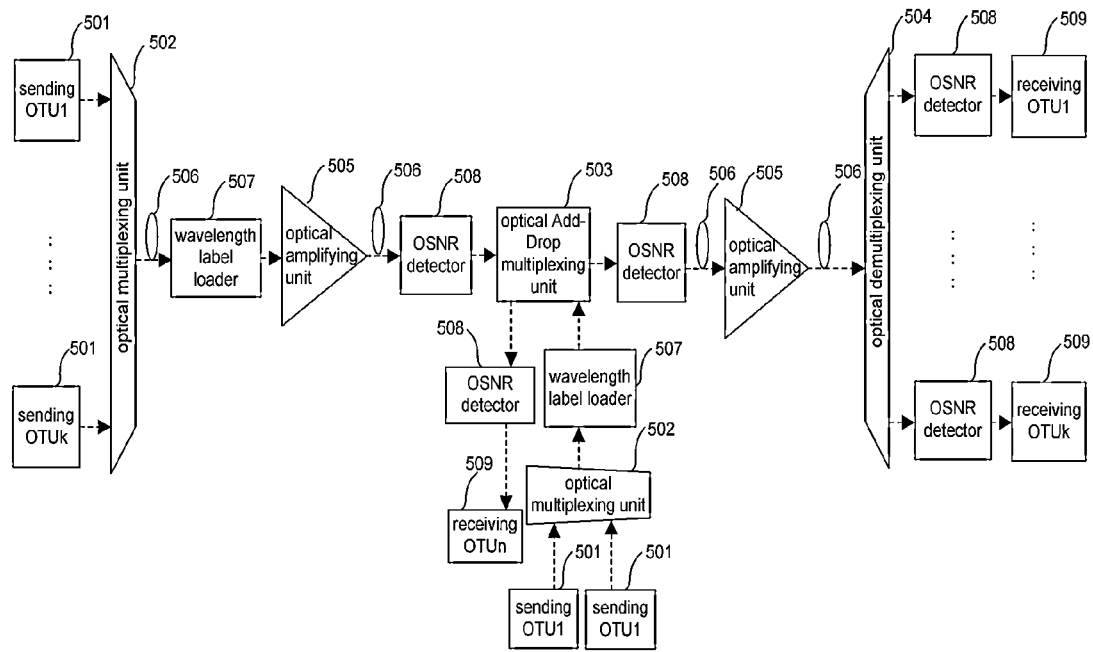
FIG. 5 is a schematic diagram of a scene of OSNR detection using a wavelength label according to an embodiment of the disclosure.

FIG. 5 is another typical scene of OSNR detection using a wavelength label. In FIG. 5, single fiber unidirectional transmission in a Wavelength Division multiplexing system may involve multiple optical signal sending OTUs 501, two optical multiplexing units 502, an optical Add-Drop multiplexing unit 503, an optical demultiplexing unit 504, two optical amplifying units 505, optical fiber 506, two wavelength label loaders 507, multiple OSNR detectors 508, and multiple optical signal receiving OTUs 509.

In the scene, a wavelength label may be loaded in a multiplexed multiwavelength optical signal. To avoid multiple wavelength labelling of a same wavelength, on a node with a service uplink and a service down link, uplink wavelength multiplexing may be completed first, multiple wavelengths may be labelled, and then the multiplexed optical signal may be transmitted in an optical multiplexed section. Wavelength labeling after multiplexing may lead to multiple wavelength labelling of a same wavelength, in which case a frequency of a wavelength label signal loaded by a wavelength label loader should be distinct, and a modulation depth should not be excessively big.

Note that OSNR detection may be performed at any point on a transmission path of an optical signal bearing a wavelength label. Shown in FIG. 5 is only a typical location for OSNR detection. For example, when there is multistage optical Add-Drop multiplexing in the system, after a wavelength label signal is loaded by a wavelength label loader, an OSNR detector may be set at each optical Add-Drop multiplexing unit, before and after each optical amplifying unit, or before an optical signal receiving OTU for online OSNR monitoring.

Figure 6:
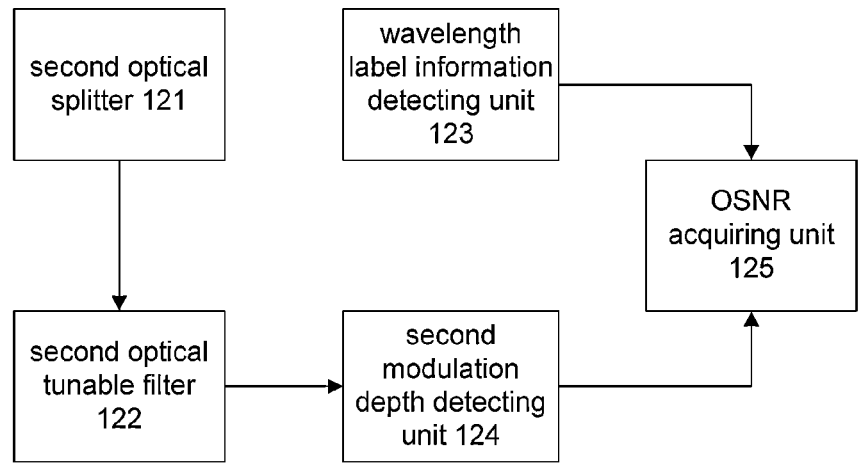
FIG. 6 is a schematic diagram of a structure of an OSNR detector in the scene of FIG. 5 according to an embodiment of the disclosure.

FIG. 6 is a schematic diagram of a structure of an OSNR detector in the scene of FIG. 5, in accordance to a case when a loading modulation depth $m_1$ is transferred along a direction of an optical signal via an OSC. The OSNR detector may include a second optical splitter 121, a second optical tunable filter 122 or a demultiplexer, a second modulation depth detecting unit 124, an OSNR acquiring unit 125, and a wavelength label information detecting unit 123. After the splitting, a single wave optical signal may be filtered out by the second optical tunable filter 122. The second modulation depth detecting unit 124 may then detect a current modulation depth $m_2$ of a wavelength label. The wavelength label information detecting unit 123 may receive the loading modulation depth $m_1$ of the wavelength label from the OSC. The OSNR acquiring unit 125 may compute an OSNR of an optical signal of a wavelength at the time via $m_1$ and $m_2$ corresponding to the optical signal of the wavelength.

Figure 7:
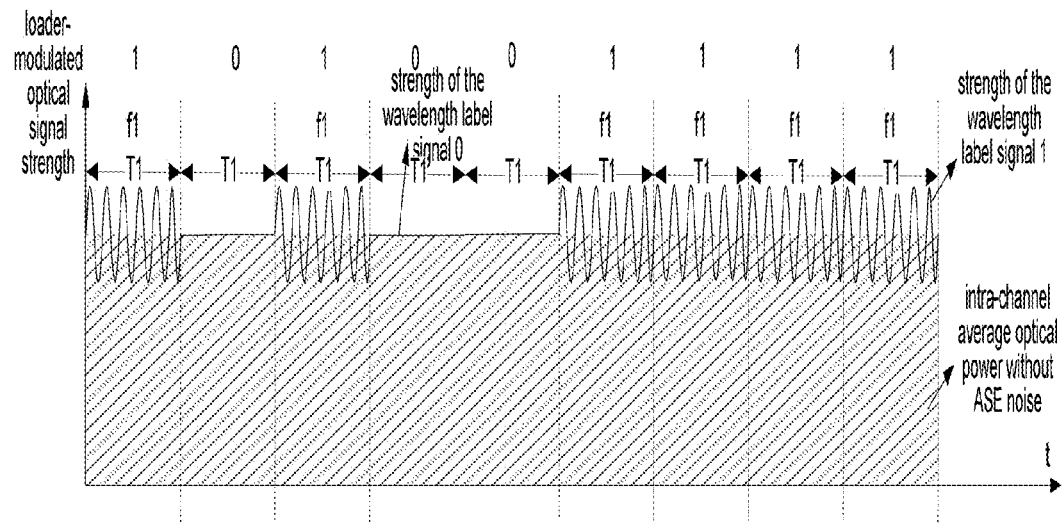
FIG. 7 is a schematic diagram of an optical signal bearing a wavelength label output by a wavelength label loader according to an embodiment of the disclosure.

FIG. 7 is an optical signal bearing a wavelength label output by a wavelength label loader, with no ASE noise. It may be seen that after a wavelength label signal is loaded in a high-speed optical signal, transferred in the channel within a period of time T1 may be a signal 1 in the wavelength label, or a signal 0 of the wavelength label. When a signal o is transferred within a period of time T1, no low-frequency signal is loaded in the optical signal. When a signal 1 is transferred within a period of time T1, a low-frequency signal corresponding to the wavelength, as shown by frequency f1 in the figure, is loaded in the optical signal. In this case the modulation depth corresponding to the wavelength label signal at the loader is $m_1$. In addition, the modulation depth $m_1$ at the loader may be transferred to an OSNR detector via a wavelength label channel formed by signals 0 and 1 in the wavelength label.

Figure 8:
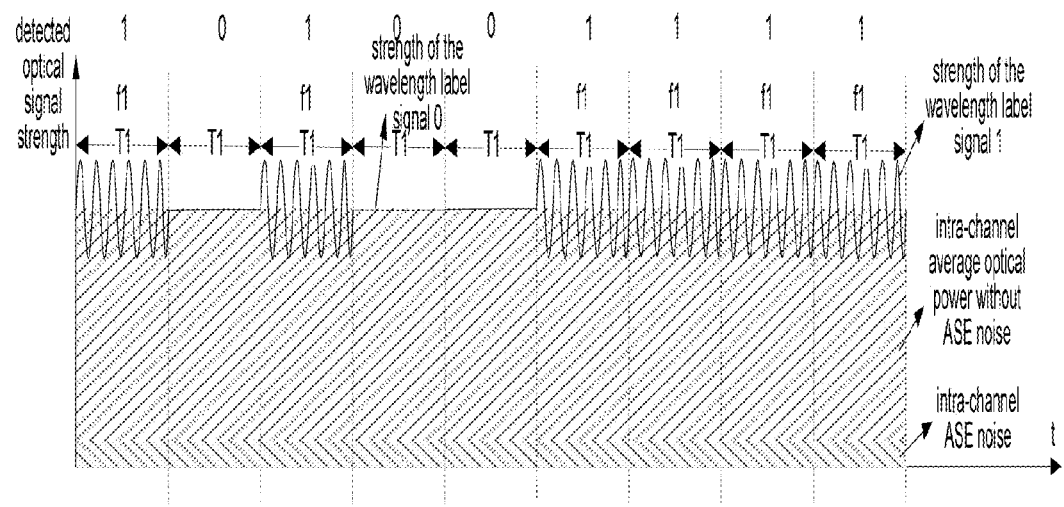
FIG. 8 is a schematic diagram of an optical signal bearing a wavelength label and an ASE noise as detected by an OSNR detector according to an embodiment of the disclosure.

FIG. 8 is an optical signal bearing a wavelength label and an ASE noise as detected by an OSNR detector. After long distance optical fiber transmission, the optical signal may carry the ASE noise. It may be seen that within a period of time T1, the OSNR detector may receive a signal 1 in the wavelength label, or a signal 0 of the wavelength label. Then, a modulation depth corresponding to the wavelength label signal at the OSNR detector may be $m_2$. The OSNR detector may receive, using the wavelength label signal, a modulation depth $m_1$ corresponding to the wavelength label on the wavelength, and compute an OSNR from $m_1$ and $m_2$. When the modulation depth $m_1$ corresponding to the wavelength label at the wavelength label loader is transmitted via an OSC, the OSNR detector may detect the current modulation depth $m_2$ corresponding to the wavelength label, receive the modulation depth $m_1$ corresponding to the wavelength label at the loader via the OSC, and compute the OSNR from $m_1$ and $m_2$.

What described are merely embodiments of the disclosure, and are not intended to limit the scope of the disclosure.

INDUSTRIAL APPLICABILITY

With a method, system, and device for detecting an optical signal-to-noise ratio provided by embodiments of the disclosure, an OSNR of an optical signal of a wavelength may be acquired according to a current modulation depth and a loading modulation depth corresponding to the wavelength label signal, such that no modulation code type of an optical payload signal has to be considered, thus simplifying a detecting algorithm. With the disclosure, it is possible to test an OSNR of an existing optical signal of a high rate such as 40 G or 100 G, in particular that of a polarization multiplexed optical signal.

The invention claimed is:

1. A system for detecting an optical signal-to-noise ratio (OSNR), comprising a wavelength label loader and an OSNR detector, wherein
the wavelength label loader is configured for loading a wavelength label signal of a frequency f1 to an optical signal of a wavelength by modulation encoding using an encoder, and sending a modulation depth corresponding to the wavelength label signal at the wavelength label loader to the OSNR detector; and
the OSNR detector is configured for: analyzing the wavelength label signal to acquire a modulation depth corresponding to the wavelength label signal at the OSNR detector; and acquiring, according to the modulation depth corresponding to the wavelength label signal at the OSNR detector and the modulation depth corresponding to the wavelength label signal at the wavelength label loader, an OSNR of the optical signal of the wavelength,
wherein the modulation depth corresponding to the wavelength label signal at the wavelength label loader is sent to the OSNR detector via an Optical Supervision Channel (OSC).

2. The system according to claim 1, wherein
the wavelength label loader comprises a wavelength label loading unit, a first optical splitter, and a first modulation depth detecting unit, wherein
the wavelength label loading unit is configured for loading the wavelength label signal to a high-speed optical signal;
the first optical splitter is configured for distributing an optical signal bearing a wavelength label signal; and
the first modulation depth detecting unit is configured for: analyzing the wavelength label signal loaded in the optical signal of the wavelength to acquire the modulation depth corresponding to the wavelength label signal at the wavelength label loader.

3. The system according to claim 2, wherein the wavelength label loader further comprises a first optical tunable filter configured for demultiplexing the optical signal distributed by the first optical splitter when the wavelength label signal is loaded in a multiwavelength optical signal of an optical multiplexed section.

4. The system according to claim 1, wherein
the OSNR detector is set anywhere on a transmission path of the optical signal bearing the wavelength label signal,
the OSNR detector comprises a second optical splitter, a wavelength label information detecting unit, a second modulation depth detecting unit, and an OSNR acquiring unit, wherein
the second optical splitter is configured for distributing an optical signal bearing a wavelength label signal;
the wavelength label information detecting unit is configured for acquiring the modulation depth corresponding to the wavelength label signal at the wavelength label loader via the OSC, and sending the modulation depth corresponding to the wavelength label signal at the wavelength label loader to the OSNR acquiring unit;
the second modulation depth detecting unit is configured for: analyzing the wavelength label signal to acquire the modulation depth corresponding to the wavelength label signal at the OSNR detector, and sending the modulation depth corresponding to the wavelength label signal at the OSNR detector to the OSNR acquiring unit; and
the OSNR acquiring unit is configured for acquiring, according to the modulation depth corresponding to the wavelength label signal at the OSNR detector and the modulation depth corresponding to the wavelength label signal at the wavelength label loader, the OSNR of the optical signal of the wavelength.

5. The system according to claim 4, wherein the OSNR detector further comprises a second optical tunable filter configured for demultiplexing the optical signal distributed by the second optical splitter on an optical multiplexed section bearing the wavelength label signal,
the OSNR acquiring unit is further configured for adjusting the OSNR according to a frequency range of an Amplified Spontaneous Emission (ASE) noise,
the wavelength label information detecting unit is integrated in the second modulation depth detecting unit.

6. A method for detecting an optical signal-to-noise ratio (OSNR), comprising:
loading, by a wavelength label loader, a wavelength label signal of a frequency f1 to an optical signal of a wavelength by modulation encoding using an encoder, and sending a modulation depth corresponding to the wavelength label signal at the wavelength label loader to an OSNR detector; and
analyzing, by the OSNR detector, the wavelength label signal to acquire a modulation depth corresponding to the wavelength label signal at the OSNR detector; and acquiring, according to the modulation depth corresponding to the wavelength label signal at the OSNR detector and the modulation depth corresponding to the wavelength label signal at the wavelength label loader, an OSNR of the optical signal of the wavelength, wherein the modulation depth corresponding to the wavelength label signal at the wavelength label loader is sent to the OSNR detector via an Optical Supervision Channel (OSC).

7. The method according to claim 6, further comprising: adjusting, by the OSNR detector, the OSNR according to a frequency range of an Amplified Spontaneous Emission (ASE) noise.

8. A wavelength label loader, comprising a wavelength label loading unit, a first optical splitter, and a first modulation depth detecting unit, wherein the wavelength label loading unit is configured for loading a wavelength label signal to a high-speed optical signal;

the first optical splitter is configured for distributing an optical signal bearing a wavelength label signal; and the first modulation depth detecting unit is configured for: analyzing the wavelength label signal loaded in an optical signal of a wavelength to acquire a modulation depth corresponding to the wavelength label signal at the wavelength label loader, and sending the modulation depth corresponding to the wavelength label signal at the wavelength label loader to an OSNR detector, wherein the modulation depth corresponding to the wavelength label signal at the wavelength label loader is sent to the OSNR detector via an Optical Supervision Channel (OSC).

9. The wavelength label loader according to claim 8, further comprising a first optical tunable filter configured for demultiplexing the optical signal distributed by the first optical splitter when the wavelength label signal is loaded in a multiwavelength optical signal of an optical multiplexed section.

10. An optical signal-to-noise ratio (OSNR) detector, comprising an optical splitter, a wavelength label information detecting unit, a modulation depth detecting unit, and an OSNR acquiring unit, wherein the optical splitter is configured for distributing an optical signal bearing a wavelength label signal;

the wavelength label information detecting unit is configured for acquiring a modulation depth corresponding to the wavelength label signal at a wavelength label loader, and sending the modulation depth corresponding to the wavelength label signal at the wavelength label loader to the OSNR acquiring unit;

the modulation depth detecting unit is configured for: analyzing the wavelength label signal to acquire a modulation depth corresponding to the wavelength label signal at the OSNR detector, and sending the modulation depth corresponding to the wavelength label signal at the OSNR detector to the OSNR acquiring unit; and the OSNR acquiring unit is configured for acquiring, according to the modulation depth corresponding to the wavelength label signal at the OSNR detector and the modulation depth corresponding to the wavelength label signal at the wavelength label loader, an OSNR of the optical signal of a wavelength, wherein the modulation depth corresponding to the wavelength label signal at the wavelength label loader is acquired via an Optical Supervision Channel (OSC).

11. The OSNR detector according to claim 10, further comprising an optical tunable filter configured for demultiplexing the optical signal distributed by the optical splitter in a multiwavelength optical signal of an optical multiplexed section bearing the wavelength label signal.

12. The OSNR detector according to claim 10, wherein the OSNR acquiring unit is further configured for adjusting the OSNR according to a frequency range of an Amplified Spontaneous Emission (ASE) noise.

13. The OSNR detector according to claim 10, wherein the wavelength label information detecting unit is integrated in the modulation depth detecting unit.

* * * * *